Patented Nov. 29, 1938

2,138,073

UNITED STATES PATENT OFFICE 2,138,073

PROCESS FOR CONCENTRATING OR ENRICHING RUBBER LATEX

Otto Eduard Schweitzer, Hochst-on-the-Main, Germany, assignor, by mesne assignments, to Revertex Limited, London, England, a corporation of England No Drawing. Application August 25, 1934, Serial No. 741,523. In Germany September 4, 1933

14 Claims. (Cl. 18—50)

This invention relates to a process for concentrating or enriching rubber latex.

For creaming rubber latex, use has hitherto been made of a series of substances of vegetable or animal origin, for example vegetable mucilages and vegetable extracts such as diagum, carragheen moss, Iceland moss, pectin or gelatines, glue and the like. Such substances have the defect that, being natural products or obtained from natural products by simple extraction or like processes, they represent extremely complex mixtures of highly divergent chemical substances and exhibit extensive variations in respect of their composition and properties. Consequently, their action varies very considerably from one preparation to another. Moreover, owing to the presence of insoluble ingredients, such as cell walls and the like, it is impossible, except by employing special precautionary measures, to prepare clear uniform solutions therefrom, so that the homogeneity of the films produced from latex concentrates prepared by their aid is generally unsatisfactory. Moreover the natural substances contain in addition to the active substances inert substances which constitute useless ballast.

The present invention aims at obviating these drawbacks and contemplates the employment for creaming latex of substances which are substantially better defined from the chemical standpoint, and are therefore free from the aforesaid defects.

To this end, according to the invention use is made of synthetically prepared, water-soluble, high molecular, hemicolloidal or eucolloidal substances, or mixtures thereof. More detailed information on the terms "hemicolloidal" and "eucolloidal" is given for example in Hermann Staudinger's work "Die hochmolekularen organischen Verbindungen", Berlin 1932, page 19.

Substances of the foregoing kind can also be obtained, by partial synthesis, from high-molecular natural substances, by chemical transformation, but such substances are, in part, less suitable for the purposes of the present invention.

Examples of substances of the aforesaid kind, are water-soluble high-molecular alcohols, such as polyvinyl alcohols, water-soluble salts, such as alkali salts or ammonium salts, of high-molecular acids, such as those of the polyacrylic acids, or alkali salts of the acids resulting from the reaction of celluloses with chloracetic acid or other halogen fatty acids, water-soluble, high molecular ethers (such as methyl- or ethoxyl ethers) of synthetically prepared products such as polyvinyl alcohols, or vegetable products such as cellulose, starch, dextrin or lichenin, as also polyethylene oxides and their derivatives.

The soluble high-molecular hemicolloidal or eucolloidal substances used in carrying out the invention form highly viscous aqueous solutions, and, in general, their creaming action is the better, the more viscous the solutions, that is to say, the more highly molecular the substances themselves. Consequently, it is the very highly molecular substances that are particularly suitable for the purposes of the present invention. If desired, specially effective creaming agents can be produced with mixtures of different substances of the aforesaid kinds.

The creaming action may also be facilitated by artificially increasing the viscosity, for example by the addition of substances endowed with that property. Thus, for example, the viscosity and creaming effect of solutions of the poly vinyl alcohols can be raised by the addition of borax.

The creaming can be carried out at ordinary temperature, but is accelerated by operating at an elevated temperature, for example by warming the rubber latex, with the added creaming agent, for several hours at temperatures up to for example 60 to 100° C.

Instead of effecting the enrichment, in latex particles, of the layer of cream by mere standing, the effect can also be produced by centrifuging in order to accelerate the operation. It may also be advantageous to concentrate the rubber latex to the desired degree, in accordance with the invention, in the first place, and then to subject it to a secondary concentration by any convenient method, such as centrifuging, filtration or evaporation, or to proceed in the reverse order.

The optimum quantities of the agents employed for creaming are easily ascertained by preliminary experiments.

The following examples will serve to illustrate the carrying out of the invention:—

*Example 1*

100 litres of 39% ammonia latex are treated with 2.5 litres of a 5% aqueous solution of sodium polyacrylate which is free from excess alkali. The mixture is left for two days at room temperature. During that period, two layers are formed, consisting of 63.5 litres of cream and 39 litres of serum. The cream contains 54% of dry matter.

*Example 2*

100 litres of 37% ammonia latex are treated with a solution of sodium polyacrylate prepared by saponifying 500 grms. of an approximately 20% emulsion of polyacrylic ester with 2000 cc. of an approximately 15% soda lye. After preheating to 60° C. the charge is treated with direct steam for an hour. After standing for 24 hours, two layers have formed. The cream layer (about 55 litres) contains, for example, 57% of dry substance. The crepe rubber prepared therefrom has a nitrogen content of 0.17%, whereas a crepe obtained from latex, under the same conditions of coagulation, contains about 0.5% of nitrogen.

*Example 3*

100 litres of 38.5% ammonia latex are treated with 20 litres of a 15% solution of polyvinyl alcohol. The mixture is left, for two days at room temperature, in a vessel in which a column of 95 cms. of liquid forms. Two layers are produced, the lower one being 20 cms. in depth and the upper one 75 cms. The cream layer contains 43% of dry substance, which is increased to 58% by further treatment in a centrifuge.

*Example 4*

100 litres of 40% ammonia latex are treated with 10 litres of a 5% aqueous solution of methylcellulose and the mixture is left to stand at room temperature for 2 days. In the course of that period two layers are formed, the lower consisting of 20 litres of serum and the upper of 90 litres of cream the dry substance in which can be increased to 60% by centrifuging. The cream can be further concentrated to 75% of dry substance, by evaporation, after the addition of a stabilizer.

*Example 5*

100 litres of ammonia latex are treated with 20 litres of a 5% aqueous solution of oxyethylcellulose. The mixture is left to stand at room temperature for 4 days, during which period two layers are formed. The cream layer has a content of 52% of dry substance, and can be further concentrated to 80% of dry substance in the evaporator, after the addition of a stabilizer.

I claim:

1. A process for enriching rubber latex, which comprises treating said rubber latex with alkali salts of polyacrylic acids and thereupon creaming by exposing it to the influence of gravity until two layers are formed in the liquid, the upper layer being richer in rubber than the original latex.

2. A process for enriching rubber latex, which comprises treating said rubber latex with alkali salts of polyacrylic acids and thereupon creaming by centrifuging the mixture.

3. A process for enriching rubber latex, which comprises treating said rubber latex with polyvinyl alcohols and thereupon creaming.

4. A process for enriching rubber latex, which comprises treating said rubber latex with high-molecular ethers soluble both in hot and cold water and thereupon creaming.

5. A process for enriching rubber latex, which comprises treating said rubber latex with high-molecular ethers soluble both in hot and cold water and thereupon creaming by centrifuging the mixture.

6. A process for enriching rubber latex, which comprises treating said rubber latex with a polyvinyl alcohol and borax, and thereupon creaming.

7. A process for enriching natural rubber latex, which comprises the steps of adding thereto water-soluble, synthetically prepared, high molecular, colloidal substances in such small amounts that the free movement of the rubber particles is maintained and causing the latex to form two layers, by creaming and separating the layer richer in rubber from the other layer.

8. A process for enriching natural rubber latex, which comprises the steps of adding thereto water-soluble, synthetically prepared, high molecular colloidal substances and creaming the latex by centrifuging.

9. A process for enriching natural rubber latex, which comprises the steps of adding thereto water-soluble, synthetically prepared, high molecular, colloidal substances produced by chemical transformation of high-molecular natural substances, causing the latex to cream forming two layers, and separating the layer richer in rubber from the other layer.

10. A process for enriching natural rubber latex, which comprises the steps of adding thereto water-soluble salts of synthetically prepared, high molecular, colloidal acids causing the latex to cream forming two layers and separating the layer richer in rubber from the other layer.

11. A process for enriching natural rubber latex, which comprises the steps of adding thereto synthetically produced, high molecular colloidal substances soluble both in hot and cold water, heating the mixture for several hours at temperature within the range between about 60° C. and 100° C. and thereafter causing the latex to cream forming two layers, the lighter layer being richer in rubber than the original latex.

12. A creamy latex concentrate having a rubber content over 52% and a subnormal content of serum solids and a small amount of water-soluble synthetically prepared high molecular colloidal substances.

13. A latex concentrate having a rubber content over 52% and a subnormal content of serum solids and a small amount of water-soluble salts of polyacrylic acids.

14. A creamy latex concentrate having a rubber content of more than 52%, a subnormal content of serum solids, and a content of water-soluble synthetically produced high molecular colloidal substances, the said contents being so low that the concentrate is not substantially thickened, the rubber particles being freely movable.

OTTO EDUARD SCHWEITZER.